United States Patent
Yoshie

[11] Patent Number: 5,557,697
[45] Date of Patent: Sep. 17, 1996

[54] METHOD FOR CONNECTING OPTICAL FIBER CABLES

[75] Inventor: Yasunori Yoshie, Kawasaki, Japan

[73] Assignee: NKK Corporation, Tokyo, Japan

[21] Appl. No.: 467,757

[22] Filed: Jun. 6, 1995

[30] Foreign Application Priority Data

Jun. 27, 1994 [JP] Japan ............................ 6-165805

[51] Int. Cl.$^6$ .................................................. G02B 6/38
[52] U.S. Cl. ..................... 385/99; 385/147; 219/121.64
[58] Field of Search .................... 219/121.63, 121.64; 385/95–99, 147

[56] References Cited

U.S. PATENT DOCUMENTS

| | | | |
|---|---|---|---|
| 4,810,277 | 3/1989 | Waitl et al. | 385/99 |
| 5,000,537 | 3/1991 | Saito et al. | 385/55 |
| 5,076,657 | 12/1991 | Toya et al. | 385/96 |
| 5,142,763 | 9/1992 | Toya et al. | 385/99 |
| 5,430,818 | 7/1995 | Hartl et al. | 385/99 |

FOREIGN PATENT DOCUMENTS

| | | |
|---|---|---|
| 0576266A3 | 12/1993 | European Pat. Off. . |
| 4030291A1 | 4/1991 | Germany . |

OTHER PUBLICATIONS

Patent Abstracts Of Japan, vol. 16, No. 305 (P–1380), Jul. 6, 1992 & JP–A–04 083206 (Fujikura Ltd. et al), Mar. 17, 1992.

Patent Abstracts Of Japan, vol. 15, No. 372 (P–1254) Sep. 19, 1991 & JP–A–03 146911 (Nippon Steel Weld Prod. & Eng. Co., Ltd., Jun. 21, 1991.

*Primary Examiner*—John Ngo
*Attorney, Agent, or Firm*—Frishauf, Holtz, Goodman, Langer & Chick

[57] ABSTRACT

A test piece 1 is prepared having the same metal tube 2 and metal sleeve 4 as in the case of metal tube covered optical fiber cables 10 and 20 to be connected and a sensor 5 for measuring temperatures in the vicinity of a welding part, prior to connection of the cables an optimum welding condition is set by variously changing welding conditions using the test piece 1 and measuring temperatures in the vicinity of the welding part with the sensor 5, the connection is made under such an optimum welding condition, and after this connection welding is done under one and the same condition as in the case of the connection using the other test piece 1, and then by the output of the sensor 5 it is to be made sure that the connection has been carried out almost under the same condition as the optimum welding condition.

6 Claims, 1 Drawing Sheet

METHOD FOR CONNECTING OPTICAL FIBER CABLES

BACKGROUND OF THE INVENTION

1. Field of the Invention

The present invention relates to a method for connecting optical fiber cables which are covered with metal tubes.

2. Description of the Related Arts

An optical fiber cable generally has the length of several hundred meters to ten-odd kilometers and wound on a bobbin, etc. In actual use, in the case where a connection distance is longer than said lengths, optical fiber cables are connected. In the case of metal tube covered optical fiber cables, two optical fiber cables are connected in the following way. Core wire optical fibers are exposed from the covered parts on the respective end parts of the two optical fiber cables to be connected. The end parts of the optical fibers are fused to each other in the state that metal sleeve having an outer diameter close to that of the metal tube is provided on one optical fiber cable side. Then, the metal sleeve is slidingly moved to a position over the metal tubes of the two optical fiber cables. The metal sleeve is caulked when necessary and welding is done between the metal sleeve and both of the metal tubes.

There are various welding methods, of which laser beam welding is usually used in that highly accurate welding is required as the metal tubes are extremely small in diameters and thin.

Welding must be carried out by setting an optimum welding condition and constantly keeping it, since the core wire optical fiber is easily affected by heat generated at the time of welding the metal tube and the metal sleeve.

The parts of the optical fibers of the two connected optical fiber cables likely to be affected most by heat during welding are completely covered by the metal tubes and the metal sleeve. Even if welding is done under the condition considered to be optimum, there is no way of inspecting the level of its influence during or after welding. Further, as the connected optical fiber cables are very long, even when abnormal states are found by inspecting the characteristics of the optical fibers on the end parts, it is impossible to identify whether the abnormalities have been generated due to fusing of the optical fibers themselves, or influence of heat by welding the metal tubes and the metal sleeve, or changes of the characteristics of the optical fibers on the other parts.

As described above, the two optical fiber cables must be connected by setting the optimum welding condition and doing welding work under such a condition. However, in the conventional manner it has been impossible to find any changes in the condition after setting, and thus connecting work had to be carried on assuming that specified accuracy and characteristics were provided.

SUMMARY OF THE INVENTION

It is an object of the present invention to provide a method for connecting optical fibers which allows confirmation that welding has been operated exactly under the optimum condition as set beforehand.

In order to attain the object, the present invention provides a method for connecting two optical fiber cables using a metal sleeve, the optical fiber cable having optical fiber and metal tube for covering thereof, the method comprising the steps of:

(a) fitting a first metal sleeve to a first metal tube to form a fitting portion, the first metal sleeve being the same as the metal sleeve and the first metal tube being the same as the metal tube;

(b) inserting a sensor for measuring temperatures into the first metal tube at a position corresponding to the fitting portion;

(c) welding the fitting portion, while changing welding conditions, and measuring temperatures to determine an optimum welding condition;

(d) exposing two optical fibers and two metal tubes by specified lengths on the respective end parts of the two optical fiber cables to be connected;

(e) fitting the metal sleeve on the exposed metal tube of one of the two optical fiber cables;

(f) fusing the two optical fibers to each other on the end parts of the two optical fiber cables;

(g) moving the metal sleeve to a position over the exposed metal tubes of the two optical fiber cables;

(h) welding the metal sleeve and the metal tubes on the entire periphery under the optimum welding condition which was determined in the step (c);

(i) fitting a second metal sleeve to a second metal tube to form a fitting portion, the second metal sleeve being the same as the metal sleeve and the second metal tube being the same as the metal tube;

(j) inserting a sensor for measuring temperatures into the second metal tube at a position corresponding to the fitting portion;

(k) welding the fitting portion under the welding condition of the step (h) while measuring temperatures by the sensor; and (l) confirming that said welding of the step (h) was made under the same condition as said optimum welding condition.

DESCRIPTION OF THE PREFERRED EMBODIMENT

Figure 1A:
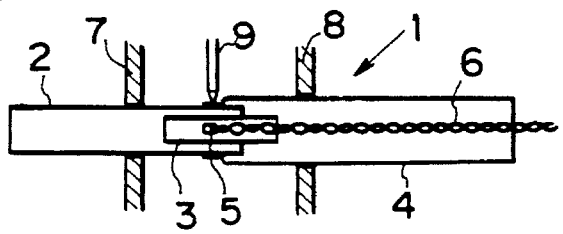
FIG. 1A to FIG. 1E are views showing the steps of the embodiment according to the present invention.

According to the present invention, at least two test pieces are prepared. The test piece has a metal tube, a metal sleeve and a sensor for measuring temperatures. The metal tube and the metal sleeve are the same as those of the metal tube covered optical fiber cables to be connected. Welding is tentatively carried out between the metal tube and metal sleeve. The sensor measures temperatures in the vicinity of a welding part, especially temperatures of the positions of the optical fibers.

Before actual connection of the optical fiber cables, an optimum welding condition is set by variously changing conditions using a pair of test pieces and measuring temperatures in the vicinity of the welding part with the sensors, which allows the best working efficiency and gives no heat effects to the optical fiber cables. Though a temperature range wherein no heat effects are given depends on the characteristics of the optical fiber, 200° C. or less is preferable, particularly 120° C. or less is more preferable.

Then, under such an optimum welding condition the two metal tube covered optical fiber cables are connected. This connection is carried out in the following way. The optical fibers as core wires and the metal tubes of both metal tube covered optical fiber cables are exposed by a specified length, respectively. The metal sleeve is fitted on one metal tube covered optical fiber cable. Both optical fibers are fused to each other. The fusing is carried out by an arc dischage machining. The metal sleeve is moved to a specified position over the exposed metal tubes of both metal tube covered optical fiber cables, and in this condition the metal sleeve and the metal tubes are welded. After the metal sleeve is moved to the specified position, the sleeve is sometimes caulked for better welding.

Then, after connection of cables, using the other pair of test pieces welding is carried out under one and the same condition as the connection. Temperatures in the vicinity of the welding part are measured by the sensor at the time of welding. It is made sure that the temperatures are the ones which will not give any heat effects to the optical fibers, and thus it is determined that no heat effect was given to the optical fibers at the time of actual connection of the cables.

According to the present invention, connection of cables is done between pre and post weldings using the test pieces. However, such connection of cables is not limited to only once. It may be operated by a plural number of times when it is expected that there will not be many fluctuations in the welding conditions, and when the results of the pre and post welding operations using the tese pieces are within the allowable values, it is possible to consider that the connection carried out by a plural number of times were operated well.

EMBODIMENT

A preferred embodiment of the present invention will be described with reference to the accompanying drawings.

FIG. 1A to FIG. 1E are views showing the steps of the embodiment according to the present invention. At this embodiment, at least two test pieces are prepared before two metal tube covered optical fiber cables to be connected are actually connected.

The test pieces to be prepared are similar to the metal tube covered optical fiber cables to be actually connected. For example, the metal tube covered optical fiber cables are cut by a specified length and their insulated layers are removed or peeled off so as to expose the metal tubes as much as necessary in length. Then, the core wire optical fibers are taken out and temperature sensors, e.g., thermocouples, are inserted thereinto. FIG. 1A shows this example.

In FIG. 1A, as for a test piece 1 a protecting tube 3 is inserted into a metal tube 2 with its optical fiber taken out when necessary and a metal sleeve 4 is attached to the metal tube 2 and caulked. This metal sleeve 4 is similar to the one used for actual connection of the optical fiber cables and caulked on the same position as in the case of the actual connection. In the protecting tube 3 a thermocouple 5 is disposed on a position corresponding to the caulking position for the metal sleeve 4 as a sensor, its wiring 6 is pulled outside through the space within the metal sleeve 4 and connected to a measuring device. The measuring device is not shown in the FIG. 1A.

The test piece 1, which comprises the metal tube 2, the metal sleeve 4, the thermocouple 5 as the sensor and the protecting tube 3 to be inserted when necessary, is rotatably held by rotary holding members 7 and 8. On the caulking part of the metal sleeve 4, a welding torch, e.g., a laser beam welding torch 9, is provided facing it.

The test piece 1 is rotated one round while holding it by the rotary holding members 7 and 8 and welded by the laser beam welding torch 9. When the welding condition is carried out, for example, by laser beam welding, conditions such as pulse strengths, pulse separations, rotary speeds of the test piece are variously changed, and temperatures are measured by the thermocouple 5. As the thermocouple 5 is inserted into the position within the metal tube from which the optical fiber has been taken out, it means that it is measuring the temperatures of the position most likely to be affected by welding heat if the optical fiber exists. By measuring temperatures in this way the most operationally efficient optimum welding condition is set within the range wherein no heat effects are given to the optical fiber.

Figure 1B:
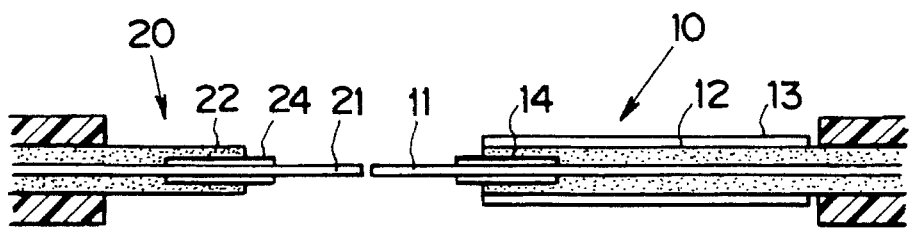

As shown in FIG. 1B, two metal tube covered fiber cables 10 and 20 to be actually connected are prepared. As for one cable 10, a core wire optical fiber 11 is exposed by a length necessary for welding while a metal tube 12 is exposed by a length necessary for attaching a metal sleeve 13. Also, for this cable 10, a protecting tube 14 is inserted into the end part of the metal tube 12. Though for the other cable 20 an optical fiber 21 is exposed by a length necessary for welding with the optical fiber 11, the exposed length of the metal tube 22 is shorter than the length of the metal tube 12, because when a metal sleeve 13 moves its end part overlaps with that of the tube 12. A protecting tube 24 is inserted into the cable 20, as well.

Figure 1C:
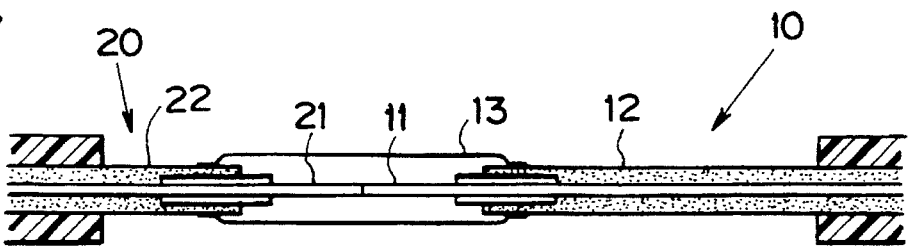

After the end parts of the optical fibers 11 and 21 of the two cables 10 and 20 are fused under this state, the metal sleeve 13 is moved from one cable 10 over to the other cable 20, and the both ends of the metal sleeve 13 are caulked as shown in FIG. 1C.

Figure 1D:
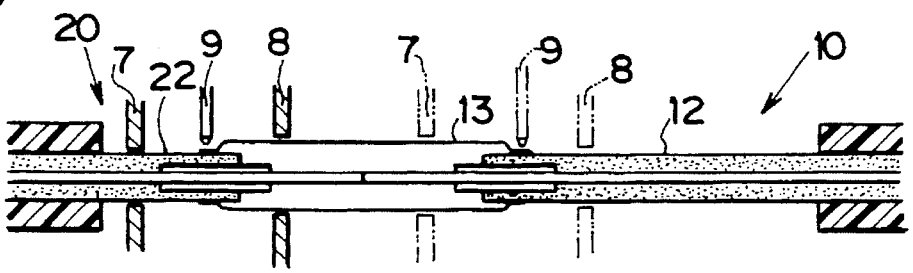

The two cables 10 and 20 whose optical fibers 11 and 21 are welded and metal tubes 12 and 22 are tentatively connected by caulking the metal sleeve 13 are brought to the welding device used for welding the test pieces as shown in FIG. 1A. That is, as shown in FIG. 1D, for the cable 20 the caulking part of the metal sleeve 13 which becomes a welding part is moved to the position of the welding torch 9, and on both of its sides the metal tube 22 and the metal sleeve 13 are held by the rotary holding members 7 and 8. Then, in the same way as in the case of the test piece 1, welding is carried out under one and the same condition. After this, the relative positions in an axial direction between the cables 10 and 20 and the welding device are changed, similar welding work is done for the cable 10 on a position indicated by a double dotted chain line in the FIG. 1D, and the actual connection is completed.

Figure 1E:
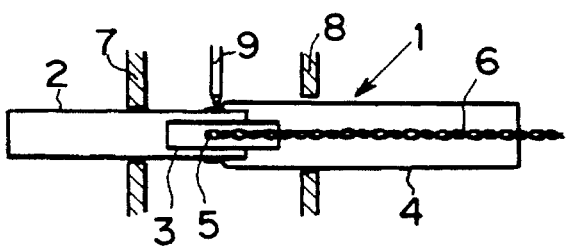

Next, as shown in FIG. 1E, welding is done under one and the same condition as in the case of the actual connection using the other test piece 1, and temperatures in the vicinity of the welding part are measured by the thermocouple 5 at the time of welding. When the measured temperatures are not far different from those at the time of welding under the condition set for the test piece 1, that is, within the allowable values, it will be identified that the actual connection was carried out under the optimum welding condition, or close to it. On the other hand, if the measured temperatures exceed the allowable values, the connection must be carried out again, since the set welding condition changed for one reason or another while operating the connection.

Some changes of the embodiment according to the present invention as shown in the Figure may be possible. For example, at this embodiment the protecting tube is inserted before welding. However, the present invention may be applied to the case where the protecting tube is not used.

Also, though the example of laser beam welding was taken, other welding, such as arc welding or the like, may be used. In these cases, it is possible to make the cable nonrotatable and the welding torch rotatable instead. As for the test pieces, temperatures may be measured by such known elements as a thermistor, a silver thermometer or the like instead of using the thermocouple as a sensor.

Further, in the above description the actual connection of the cables was carried out once during welding of the test pieces which was done twice. However, it is possible to connect cables continuously by a plural number of times if a welding condition is identified to be relatively stable.

According to the present invention, prior to connection of two metal tube covered optical fiber cables by welding using a metal sleeve temperatures in the vicinity of a welding part are measured by test pieces having the same type of metal tubes, a metal sleeve and a sensor and an optimum welding condition is set, and then the cables are connected under this condition, after this the other test pieces are welded under the same condition as in the case of the actual connection, and if at this time the output result of the temperature sensor is the same as in the case of welding under the optimal condition the connection is identified to have been carried out normally. Thus, whereas conventionally it has been impossible to do post-connection checking of the fluctuations of the welding condition which may occur during connection and problems have actually occured at the time of use even if the connection is considered to be good, such inconveniencies will be prevented according to the present invention.

Further, it will be possible as well to improve working efficiency of the connection, since welding can be carried out simply within the allowable values thus preventing welding flaws and the welding condition can be set up to the limit of the allowable values.

Furthermore, it will be made possible to exactly grasp the influence of heat on the optical fibers by quantitatively measuring temparature changes during welding which is done using test pieces. At the conventional method, even if a part of the optical fiber cable is cut off and welding is tried by using it as a test piece in the condition that the optical fiber exists, the influence of the metal sleeve welding on the optical fiber may only be observed visually. When there are color changes of the optical fiber, heat effect will be easily identified to be considerable. However, as there exists a good possibility of deterioration in characteristics even without any color changes, identification by this observation is risky. Nevertheless, a method for quantitatively measuring changes in characteristics of the optical fiber itself caused by the influence of the metal sleeve welding still remains to be found. Thus, according to the present invention, it will be made possible to operate quantitative measurement of the heat influence level, set an optimum welding condition and certify quality after connection of the cables.

What is claimed is:

1. A method for connecting two optical fiber cables using a metal sleeve, the optical fiber cables each having an optical fiber and metal tube for covering thereof, the method comprising the steps of:

(a) fitting a first metal sleeve to a first metal tube to form a fitting portion, the first metal sleeve being the same as the metal sleeve and the first metal tube being the same as the metal tube;

(b) inserting a sensor for measuring temperatures into the first metal tube at a position corresponding to the fitting portion;

(c) welding the fitting portion, while changing welding conditions, and measuring temperatures to determine an optimum welding condition;

(d) exposing two optical fibers and two metal tubes by specified lengths on the respective end parts of the two optical fiber cables to be connected;

(e) fitting the metal sleeve on the exposed metal tube of one of the two optical fiber cables;

(f) fusing the two optical fibers to each other on the end parts of the two optical fiber cables;

(g) moving the metal sleeve to a position over the exposed metal tubes of the two optical fiber cables;

(h) welding the metal sleeve and the metal tubes on the entire periphery under the optimum welding condition which was determined in the step (c);

(i) fitting a second metal sleeve to a second metal tube to form a fitting portion, the second metal sleeve being the same as the metal sleeve and the second metal tube being the same as the metal tube;

(j) inserting a sensor for measuring temperatures into the second metal tube at a position corresponding to the fitting portion;

(k) welding the fitting portion under the welding condition of the step (h) while measuring temperatures by the sensor; and (l) confirming that said welding of the step (h) was made under the same condition as said optimum welding condition.

2. The method of claim 1, wherein the first metal sleeve is fitted to the first metal tube and caulked in the step (a); and the second metal sleeve is fitted to the second metal tube and caulked in the step (i).

3. The method of claim 1, wherein the sensor for measuring temperatures is a thermocouple.

4. The method of claim 1, wherein said welding of the step (c) is a laser beam welding.

5. The method of claim 4, wherein said laser beam welding is a laser beam pulse welding.

6. The method of claim 1, wherein the optimum welding condition is set within a range wherein no heat effects are given to the optical fiber.

* * * * *